United States Patent
Becchi et al.

(10) Patent No.: US 8,917,279 B2
(45) Date of Patent: Dec. 23, 2014

(54) METHOD AND SYSTEM TO DYNAMICALLY BIND AND UNBIND APPLICATIONS ON A GENERAL PURPOSE GRAPHICS PROCESSING UNIT

(75) Inventors: Michela Becchi, Columbia, MO (US); Kittisak Sajjapongse, Columbia, MO (US); Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 200 days.

(21) Appl. No.: 13/357,351

(22) Filed: Jan. 24, 2012

(65) Prior Publication Data

US 2012/0188263 A1    Jul. 26, 2012

Related U.S. Application Data

(60) Provisional application No. 61/435,454, filed on Jan. 24, 2011, provisional application No. 61/510,514, filed on Jul. 22, 2011.

(51) Int. Cl.
*G06F 12/02* (2006.01)
*G09G 5/36* (2006.01)
*G06T 1/60* (2006.01)
*G06F 12/10* (2006.01)
*G06F 9/50* (2006.01)

(52) U.S. Cl.
CPC .......... *G06F 12/0284* (2013.01); *G06F 12/109* (2013.01); *G06T 1/60* (2013.01); *G06F 9/5016* (2013.01)

USPC .................. 345/543; 530/544; 530/545

(58) Field of Classification Search
CPC ......... G06T 1/60; G06F 12/023; G09G 5/363
See application file for complete search history.

(56) References Cited

U.S. PATENT DOCUMENTS

| | | | |
|---|---|---|---|
| 2004/0205738 A1* | 10/2004 | Yoshida et al. | 717/150 |
| 2005/0138612 A1* | 6/2005 | Asao | 717/152 |
| 2006/0262127 A1* | 11/2006 | Stauffer et al. | 345/543 |
| 2007/0277160 A1* | 11/2007 | Camiel | 717/136 |
| 2008/0015808 A1* | 1/2008 | Wilson et al. | 702/123 |
| 2011/0063313 A1* | 3/2011 | Bolz et al. | 345/531 |

OTHER PUBLICATIONS

Denning, P.J. and Coile, Steve "Implementation of Swapping in Virtual Memory", George Mason University, Fall 1994.*

* cited by examiner

*Primary Examiner* — David Zarka
*Assistant Examiner* — Tapas Mazumder
(74) *Attorney, Agent, or Firm* — Joseph Kolodka

(57) ABSTRACT

A system for dynamically binding and unbinding of graphics processing unit GPU applications, the system includes a memory management for tracking memory of a GPU used by an application, and a source-to-source compiler for identifying nested structures allocated on the GPU so that the virtual memory management can track these nested structures, and identifying all instances where nested structures on the GPU are modified inside kernels.

20 Claims, 4 Drawing Sheets

METHOD AND SYSTEM TO DYNAMICALLY BIND AND UNBIND APPLICATIONS ON A GENERAL PURPOSE GRAPHICS PROCESSING UNIT

This application claims the benefit of both U.S. Provisional Application No. 61/435,454, entitled, "Heterogenous cluster Visualization", filed Jan. 24, 2011, and U.S. Provisional Application No. 61/510,514, entitled, "Virtual Memory Based Runtime to support Multitenancy in Clusters with Many-Cores", filed Jul. 22, 2011, and this application is related to co-pending U.S. patent application Ser. No. 13/357,087, entitled "A METHOD AND SYSTEM FOR MEMORY AWARE RUNTIME TO SUPPORT MULTITENANCY IN HETEROGENEOUS CLUSTERS", filed Jan. 24, 2012, of which the contents of all are incorporated herein by reference.

BACKGROUND OF THE INVENTION

The present invention relates generally to a general-purpose graphics processing unit and more particularly to a method and system to dynamically bind and unbind applications on a general purpose graphics processing unit.

Many-core devices like graphics processing units GPUs are designed to be used by one application at a time. However, more often than not, the resources available in a graphics processing unit GPU are under-utilized by a single application. Techniques that allow sharing of a GPU among multiple applications (multiprogramming) can improve the utilization of the GPU. This will require dynamic pre-emption of running applications and dynamic remapping of applications to GPUs.

In some situations it is desirable to checkpoint applications running on a GPU and restart these applications on a different GPU. For example, this holds when the GPU or the host that the GPU is attached to experience failures. This will require that the execution of an application be stopped on one GPU and re-started on another GPU.

The following references are referred to in the further background discussion.

[1] Nickolls, I. Buck, M. Garland, and K. Skadron. 2008. Scalable Parallel Programming with CUDA. In *Queue* 6, 2 (March 2008), 40-53.
[2] H. Takizawa, K. Sato, K. Komatsu, and H. Kobayashi. 2009. CheCUDA: A Checkpoint/Restart Tool for CUDA Applications. In *Proceedings of the* 2009 *International Conference on Parallel and Distributed Computing, Applications and Technologies* (PDCAT '09), IEEE Computer Society, Washington, D.C., USA, 408-413.
[3] A. Nukada, H. Takizawa, and S. Matsuoka. NVCR: A Transparent Checkpoint-Restart Library for NVIDIA CUDA. In 2011 *IEEE International Symposium on Parallel and Distributed Processing Workshops and Phd Forum* (*IPDPSW*), pp. 104-113, 16-20 May 2011.

In NVIDIA's CUDA runtime [1], procurement of applications to GPUs is explicitly made by the programmer (using the cudaSetDevice function), and statically defined for the whole application life-time. There is no mechanism to dynamically stop the application, and resume its execution on a different GPU. Similarly, there are no advanced scheduling mechanisms of concurrent applications onto available GPUs.

Two solutions (CheCUDA [2], NVCR [3]) have been proposed for checkpoint and restart of applications on GPUs. Both solutions suffer from a major limitation: the checkpointed state is such that the application can be re-started only on the GPU that was used for check-pointing. This is because of the use of GPU pointers in the application code. Therefore, these solutions do not fully solve the problem of preempting an application and resuming its execution on a different GPU.

Accordingly, there is a need for dynamic binding and unbinding of graphics processing unit GPU applications which overcomes the failings of the prior art. No solution is known to pre-empt or stop execution of an application that is executing on a GPU, and subsequently re-start the application on a different GPU transparently to the user.

BRIEF SUMMARY OF THE INVENTION

The invention is directed to a system for dynamically binding and unbinding of graphics processing unit GPU applications, the system includes a memory management for tracking memory of a GPU used by an application, and a source-to-source compiler for identifying nested structures allocated on the GPU so that the virtual memory management can track these nested structures, and identifying all instances where nested structures on the GPU are modified inside kernels.

In an alternative aspect, the invention is directed to a method for dynamically binding and unbinding of graphics processing unit GPU applications, the method tracking memory of a GPU used by an application, identifying nested structures allocated on the GPU so that step can track these nested structures, and identifying all instances where nested structures on the GPU are modified inside kernels.

These and other advantages of the invention will be apparent to those of ordinary skill in the art by reference to the following detailed description and the accompanying drawings.

DETAILED DESCRIPTION

The present invention is directed to applications running on nodes or compute clusters including general purpose CPUs and Graphics Processing Unit (GPUs), and making use of both these computational resources. In particular, the invention addresses the following problem: an application that is executing on a GPU cannot be stopped (pre-empted or unbound) and re-started (re-bound) on a different GPU transparently to the user/programmer. The present an inventive method provides for dynamic binding and unbinding of GPU applications 100, see FIG. 1.

In this invention, use of the following terminology is made. Binding an application to a graphics processing unit GPU means that the application is assigned to the GPU, and can execute on it. Unbinding an application from a GPU means that an application that is currently using the GPU resources is pre-empted, the application's full state is saved, so that the application can be re-started on the same or on a different GPU at a later time.

The invention provides a system/method to dynamically bind and unbind applications to and from a GPU. The invention includes a virtual memory management aspect 102 and a source-to-source compiler aspect 103. The virtual memory management scheme, that tracks the GPU memory usage by an application, and saves the state of the GPU in a platform independent way, and the source-to-source compiler makes appropriate modifications to the application so that virtual memory management on GPU works correctly also in the presence of nested GPU pointers.

Figure 1:
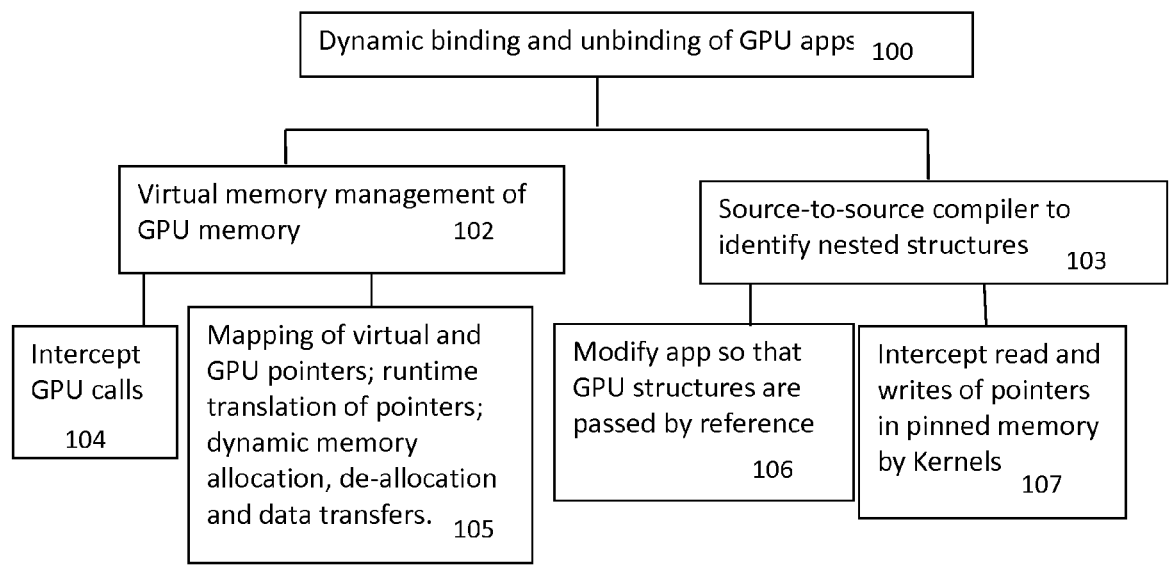
FIG. 1 is a high level block diagram of key aspects of the present invention.

Referring again to FIG. 1. FIG. 1, key aspects of the invention are shown in diagram form. The dynamic binding and unbinding of GPU applications 100 includes the virtual memory management of GPU memory 102 and source-to-source compiling to identify nested structures 103. The virtual memory management includes intercepting GPU calls 104; and mapping of virtual and GPU pointers, runtime translation of pointers; dynamic memory allocation, de-allocation and data transfers 105. The source-to-source compiler includes modifying application structures so that GPU structures are passed by reference 106 and intercepting reads and writes of pointers in pinned memory kernels 107.

Virtual Memory Management

The invention tracks the GPU memory used by the application. In particular, the invention tracks all GPU pointers, and assigns a virtual pointer to every GPU pointer. The invention translates virtual pointers into GPU pointers before the execution of a kernel on the GPU. The invention technique ensures that applications only receive and manipulate virtual pointers. Translation of virtual pointers to GPU pointers occurs at runtime. Since the application's state only includes virtual pointers, the invention is able to re-start the application on the same or a different GPU. During re-start, we re-allocate the required memory regions on the target GPU and map the corresponding GPU pointers to the virtual pointers used by the application.

Source-to-Source Compiler

This compiler serves three main functions: (a) identify nested structures that are allocated on the GPU so that the virtual memory management system can track these structures; (b) convert, if necessary, all instances where structures sent to GPU are passed by value into structures that are passed by reference; and (c) identify all instances where nested structures on GPU are modified inside kernels.

Figure 2:
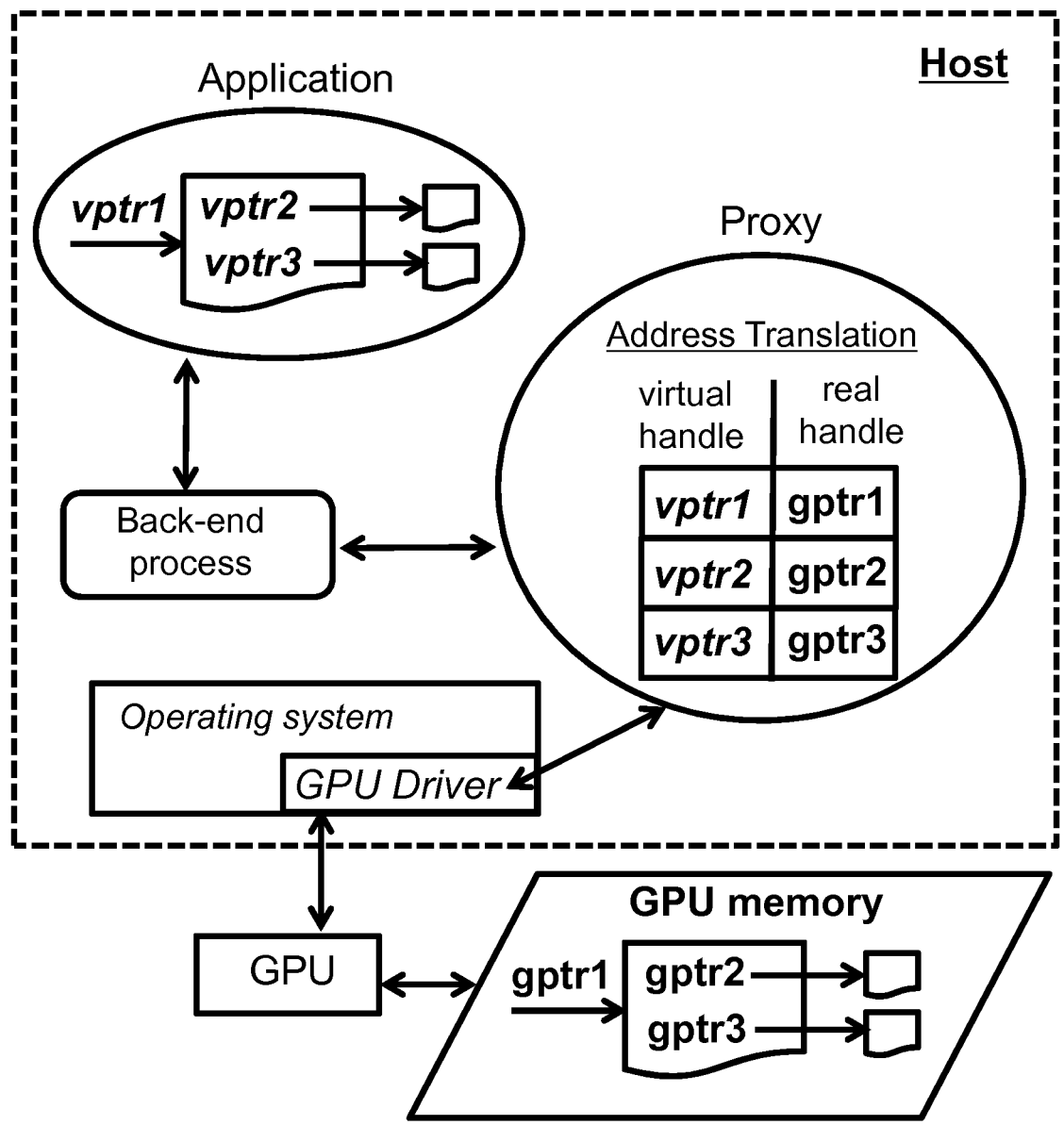
FIG. 2 shows a configuration of an exemplary system for implementing the invention.

Referring to FIG. 2, there is shown an exemplary system for implementing the invention. All GPU calls from the application are intercepted and forwarded to a separate, back-end process. This process spawns a proxy process for each application. The proxy process is responsible for coordinating with the GPU on behalf of the application. To this end, the proxy process: (i) manages the virtual-pointers-to-GPU-pointers mapping table, (ii) issues GPU calls to the GPU driver, and (iii) transparently performs memory transfers between CPU and GPU on behalf of the application. For example, consider the allocation of a structure in GPU memory (gptr1) that has two fields (gptr2 and gptr3), both of which point to different regions of memory on the GPU.

Reference herein to a nested structure means a structure with at least one field that is a placeholder for a GPU pointer. All nested structures are known, at compile time, to our memory management runtime. The proxy process associates virtual pointers, say vptr1, vptr2, and vptr3, to the three GPU pointers gptr1, gptr2 and gptr3, and returns such virtual pointers to the application. In addition, the proxy process performs memory allocations, de-allocations and data transfers on behalf of the application. In particular, the proxy process delays the data allocations (and the corresponding data transfers) until the data are required (typically by GPU kernel calls).

Finally, if the application is unbound from GPU1 and re-bound to GPU2, the proxy-process will issue the necessary data de-allocations, data allocations and data transfers. In particular, it will free pointers gptr1, gptr2 and gptr3 on GPU1 and associate a new set of GPU pointers residing on GPU2 (say gptr4, gptr5 and gptr6) to vptr1, vptr2, and vptr3. The use of virtual pointers makes the GPU unbinding/binding process totally transparent to the application.

Figure 3:
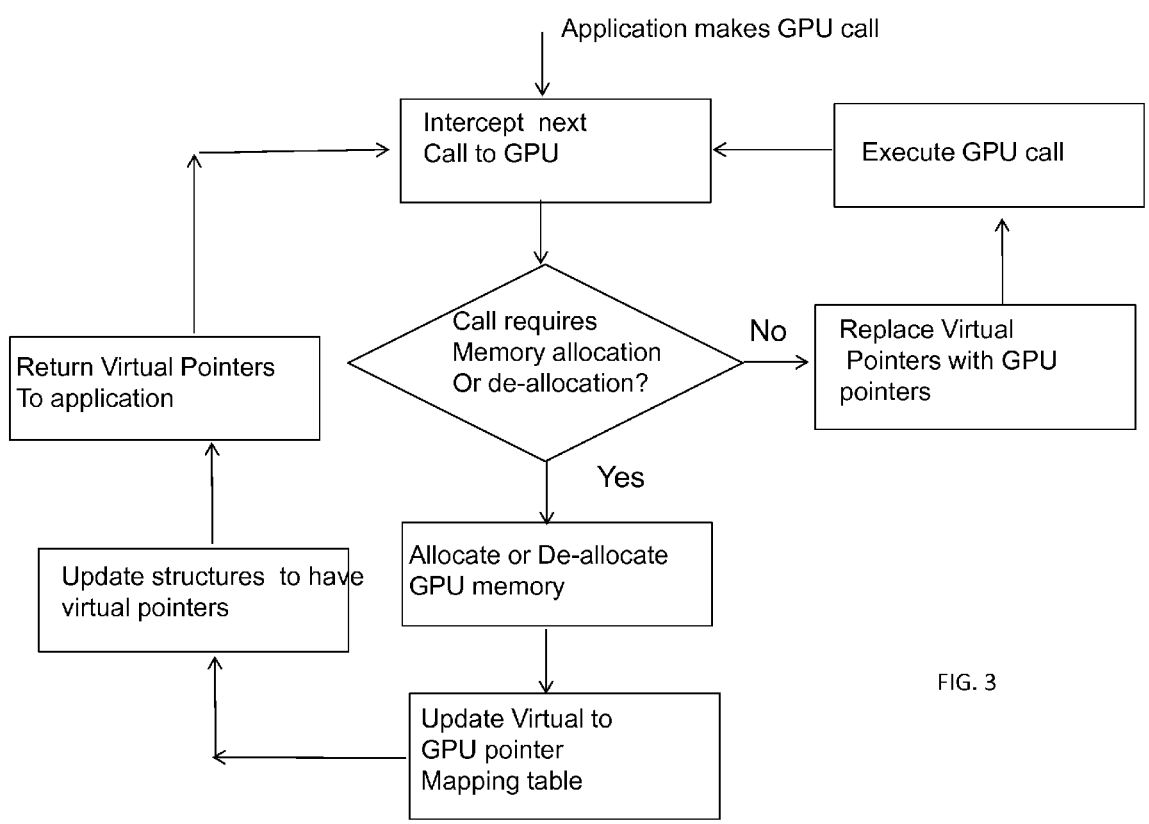
FIG. 3 is a flow diagram of virtual memory management in accordance with the invention.

Referring to FIG. 3, there shown the flow of control when the application makes a GPU call. In particular, FIG. 3 focuses on data allocations, data de-allocations, data transfers and kernel calls. When the application performs a memory allocation, the proxy process creates the virtual pointers (say, vptr1, vptr2 and vptr3), and returns them to the application. The application will use such virtual pointers during its lifetime.

When the application invokes a memory transfer between CPU and GPU, the proxy process uses the information to update its internal table. However, no GPU memory allocations and data transfers are performed until the data are required (typically by a kernel call). When the application performs a kernel call, the proxy process inspects the parameters of the call and the address translation table and uses such information to perform GPU memory allocations and data transfers. It then replaces the virtual pointers with the real GPU pointers, and issues the kernel call to the GPU driver with the GPU pointers as arguments. The GPU executes the call, and the proxy process waits for the next GPU call.

One possible implementation of the described memory manager is the following: the memory manager will include a CPU memory region, called swap area, including a copy of the data that will reside or already reside in device memory. Each page translation table entry will have three pointers: (i) a virtual pointer, (ii) a device pointer, and (iii) a swap area pointer. A memory allocation operation will have the only effect of creating a virtual pointer. A memory transfer from host to device will have the effect of setting the swap area pointer to the CPU address where the data reside. When a kernel call using a particular virtual address is invoked, device memory allocation is performed, and the device pointer field is updated. In addition, the swap area pointer is used to properly copy the required data to device.

Figure 4:
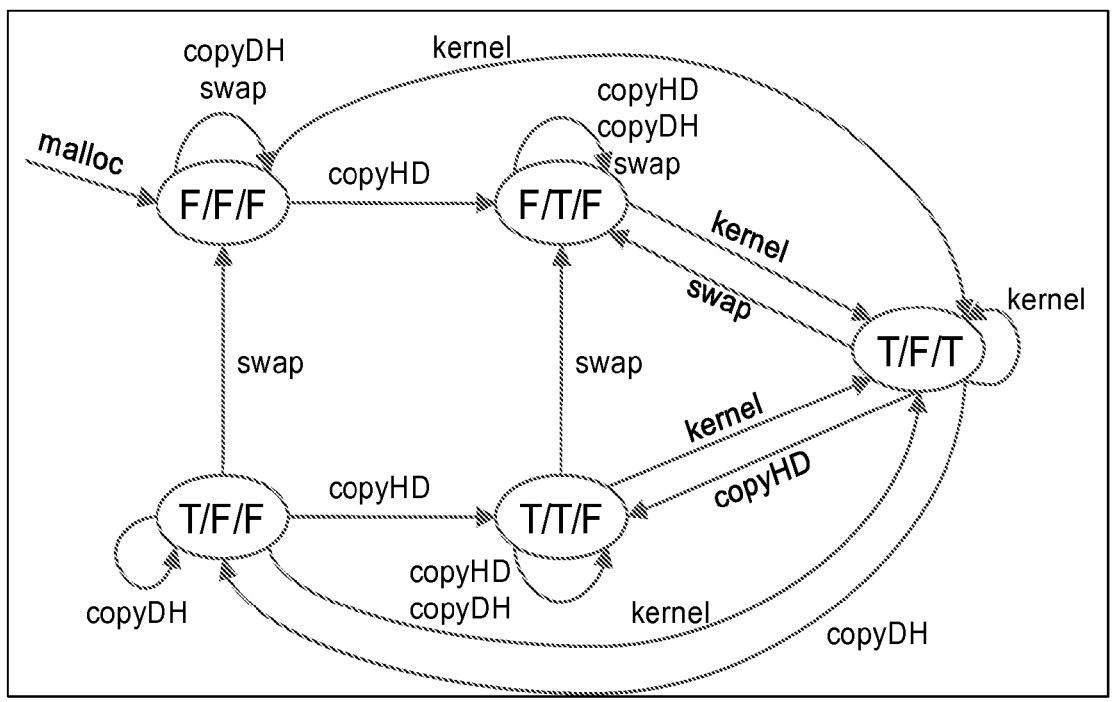
FIG. 4 is a diagram of a memory manager state configuration for memory management of FIG. 3, in accordance with the invention.

To minimize the number of memory copies, each address translation table entry can be associated with three boolean flags: isAllocated, toCopyToDevice, and toCopyToHost, indicating whether the entry has been allocated on device, whether the corresponding data have to be copied to device, and whether the corresponding data are up-to-date on device (but not on the host), respectively. The state machine describing the transitions of these flags depending on the operation performed—malloc, copy from host to device ($copy_{HD}$) and from device to host $copy_{DH}$), kernel call and forced swap—is represented in FIG. 4.

A key feature of the invention is the virtual memory management at run-time. By tracking all GPU memory usage of an application, it is possible to capture the entire GPU state of an application at any time during the execution of the application. Furthermore, unlike all prior approaches, the GPU state captured is re-locatable to other GPUs in the node/cluster.

From the foregoing it can be appreciated that the invention provides a NEW capability that does not exist today. Using this capability, one can achieve (a) better utilization of GPU resources, and (b) fault-tolerance for applications using GPUs. Better utilization of GPU resources can lead to faster operation.

From the foregoing it can be appreciated that the invention solves other problems: 1. Many-core devices like GPUs are designed to be used by one application at a time. However, more often than not, the resources available in a GPU are under-utilized by a single application. Techniques that allow sharing of a GPU among multiple applications (multiprogramming) can improve the utilization of the GPU. This will require dynamic pre-emption of running applications and dynamic remapping of applications to GPUs. 2. In some situations it is desirable to checkpoint applications running on a GPU and restart these applications on a different GPU. For example, this holds when the GPU or the host that the GPU is attached to experience failures. This will require that the execution of an application be stopped on one GPU and re-started on another GPU.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A system for dynamically binding and unbinding of general purpose graphics processing unit (GP/GPU) applications, the system comprising:
a memory management for tracking memory of a GPU used by an application unrelated to graphics processing tasks of the GPU; and
a source-to-source compiler for identifying nested structures allocated on the GPU so that a virtual memory management tracks the nested structures, and identifies all instances where nested structures on the GPU are modified inside kernels
a process for intercepting a GPU call from the application to spawn a proxy process to coordinate GPU usage on behalf of the application and when the application performs a kernel call, the proxy process inspects the parameters of the call and an address translation table and uses information of the parameters and the address translation table to perform GPU memory allocations and data transfers for restarting the application on another GPU.

2. The system of claim 1, wherein said virtual memory management tracks all GPU pointers.

3. The system of claim 1, wherein said virtual memory management assigns a virtual pointer to every GPU pointer.

4. The system of claim 1, wherein said virtual memory management translates virtual pointers into GPU pointers before execution of a kernel on the GPU.

5. The system of claim 1, wherein the source-to-source compiler converts, if necessary, all instances where structures sent to GPU are passed by value into structures that are passed by reference.

6. The system of claim 1, comprising capturing all GPU state of the application at any time during the execution of the application.

7. The system of claim 1, wherein said memory management comprises a CPU memory region, called a swap area, including a copy of data that will reside or already reside in device memory, each page translation table entry having a virtual pointer, a device pointer, and a swap area pointer.

8. The system of claim 7, wherein a memory allocation operation will have the only effect of creating a virtual pointer and a memory transfer from host to device will have the effect of setting the swap area pointer to the CPU address where the data reside.

9. The system of claim 8, wherein when a kernel call using a particular virtual address is invoked, device memory allocation is performed, and the device pointer field is updated and the swap area pointer is used to properly copy the required data to device.

10. The system of claim 9, wherein to minimize a number of memory copies, each address translation table entry can be associated with three boolean flags indicating whether the entry has been allocated on device, whether the corresponding data have to be copied to device, and whether the corresponding data are up-to-date on device (but not on the host), respectively.

11. A method for dynamically binding and unbinding of general purpose graphics processing unit (GP/GPU) applications, the method comprising:
intercepting a GPU call from an application unrelated to graphics processing tasks of the GPU and forwarding the GPU call to a proxy process for the application to coordinate GPU usage on behalf of the application by:
(i) tracking memory of a GPU used by the application;
(ii) identifying nested structures allocated on the GPU so that step (i) can track the nested structures, and
(iii) identifying all instances where nested structures on the GPU are modified inside kernels; and
when the application performs a kernel call, the proxy process inspects the parameters of the call and an address translation table and uses information of the parameters and the address translation table to perform GPU memory allocations and data transfers for restarting the application on another GPU.

12. The method of claim 11, wherein said step (i) comprises tracking all GPU pointers.

13. The method of claim 11, wherein said step (i) comprises assigning a virtual pointer to every GPU pointer.

14. The method of claim 11, wherein said step (1) comprises translating virtual pointers Into GPU pointers before execution of a kernel on the GPU.

15. The method of claim 11, wherein said step (ii) comprises converting, if necessary, all instances where structures sent to GPU are passed by value into structures that are passed by reference.

16. The method of claim 11, wherein step (ii) comprises capturing all GPU state of the application at any time during the execution of the application.

17. The method of claim 11, wherein said step (i) comprises a CPU memory region, called a swap area, including a copy of data that will reside or already reside in device memory, each page translation table entry having a virtual pointer, a device pointer, and a swap area pointer.

18. The method of claim 17, wherein a memory allocation operation will have the only effect of creating a virtual pointer and a memory transfer from host to device will have the effect of setting the swap area pointer to the CPU address where the data reside.

19. The method of claim 18, wherein when a kernel call using a particular virtual address is invoked, further comprising performing a device memory allocation, updating the device pointer field and using the swap area pointer to properly copy required data to device.

20. The method of claim 19, wherein to minimize a number of memory copies, further comprising associating each address translation table entry with three boolean flags indicating whether the entry has been allocated on device, whether the corresponding data have to be copied to device, and whether the corresponding data are up-to-date on device but not on the host, respectively.

* * * * *